April 29, 1924.

J. M. COLONY

BLENDER

Filed June 23, 1923 4 Sheets-Sheet 2

1,492,019

Inventor.
John M. Colony
by J. H. McCuad
his Atty.

April 29, 1924. 1,492,019
J. M. COLONY
BLENDER
Filed June 23, 1923 4 Sheets-Sheet 3

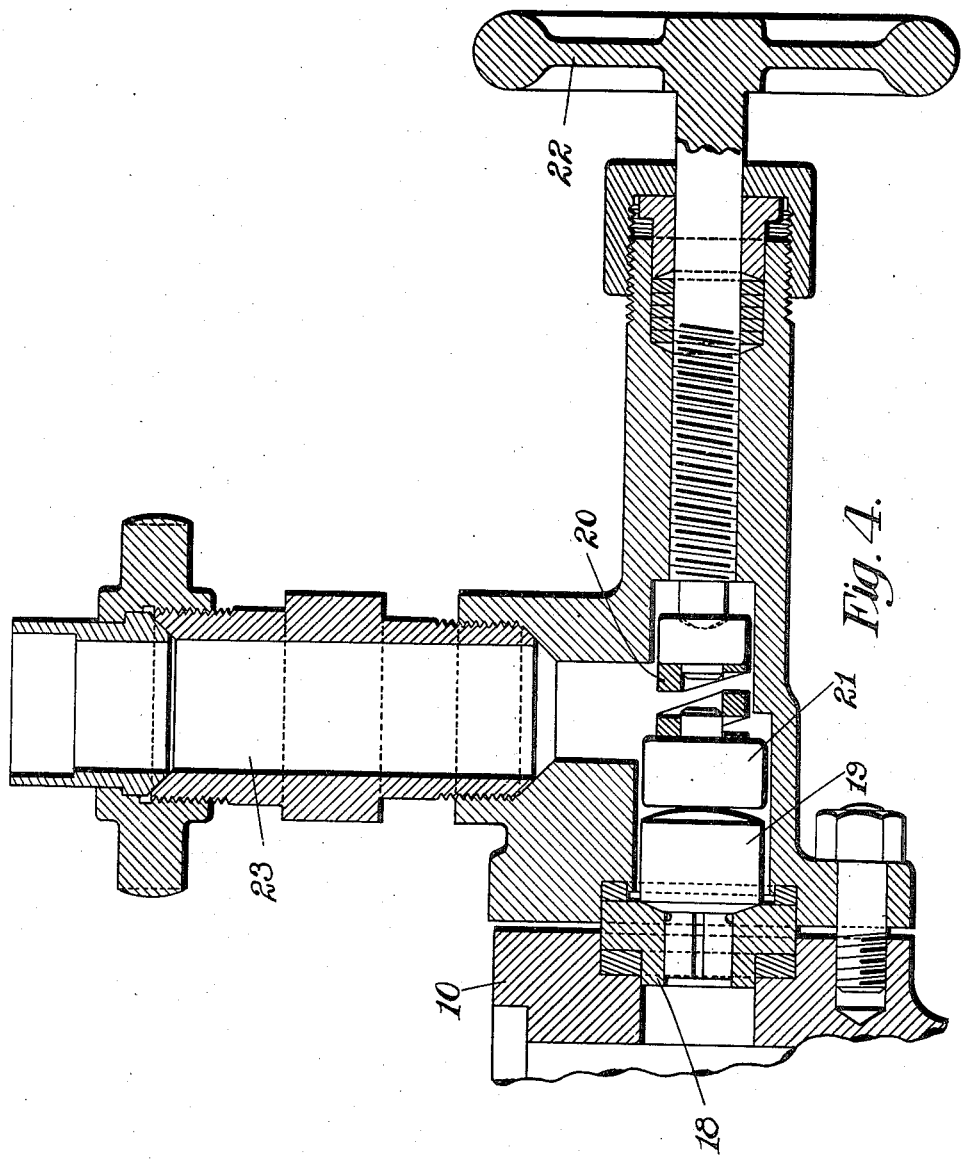

Patented Apr. 29, 1924.

1,492,019

UNITED STATES PATENT OFFICE.

JOHN M. COLONY, OF NEWTON, MASSACHUSETTS.

BLENDER.

Application filed June 23, 1923. Serial No. 647,319.

*To all whom it may concern:*

Be it known that I, JOHN M. COLONY, a citizen of the United States, residing at Newton, in the county of Middlesex and State of Massachusetts, have invented certain new and useful Improvements in Blenders, of which the following is a specification.

This invention relates to apparatus of the type used extensively in dairies, and to some extent in other industries, to reduce a liquid composition to a homogeneous consistency. Such machines or apparatus are known as homogenizers or blenders, and they consist, briefly stated, of a pump capable of producing high pressures and squeezing surfaces between which the liquid to be treated is forced while under said pressure. The flow of the liquid between the squeezing surfaces under the pressure imposed has the effect of breaking up the fat globules of milk or cream, and thus reduces the tendency of the fat globules to separate from the other constituents of the liquid, or, in other words, it reduces the liquid to a more homogeneous consistency.

Under some circumstances it is desirable to limit the pressure to which the liquid is subjected in such an apparatus. A common condition under which such a limitation is desirable is in the mixing of cream and its preparation for retail distribution. Cream which is to be used in tea or coffee, if subjected to too high a pressure during the homogenizing or blending process, acts in the tea or coffee much as frozen cream does, rising to the surface and presenting a flaky appearance or scum. It has been determined, however, that if the pressure on the cream is limited to 250 lbs., for example, this objection is entirely overcome and the cream acts in a normal manner. In the treatment of other liquids, solutions, and emulsions, there are many conditions under which it is desirable to limit the pressure in order to produce satisfactory results.

The present invention aims to improve machines of the character above designated with a view to controlling the pressure to which the liquid will be subjected more accurately than has been possible heretofore. The invention also aims to devise a mechanism for effecting this control which will be simple in construction, reliable in operation, economical to manufacture, and which can be readily adjusted to vary the pressure produced.

The nature of the invention will be readily understood from the following description when read in connection with the accompanying drawings, and the novel features will be particularly pointed out in the appended claims.

In the drawings,

Fig. 4 is a cross sectional view through the squeezing mechanism and adjacent parts.

Figure 1:
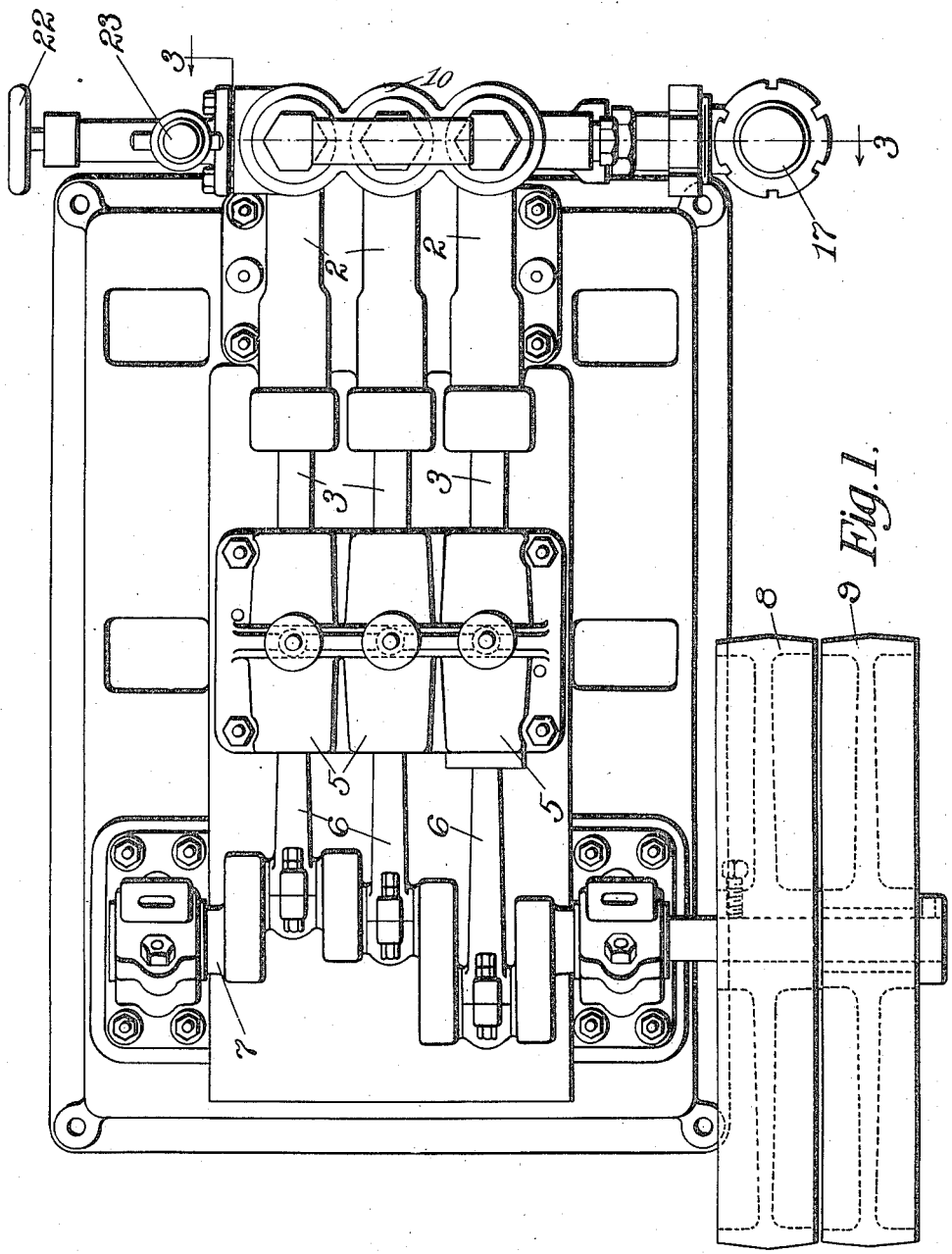
Figure 1 is a plan view of a blender embodying the present invention.
Figure 2:
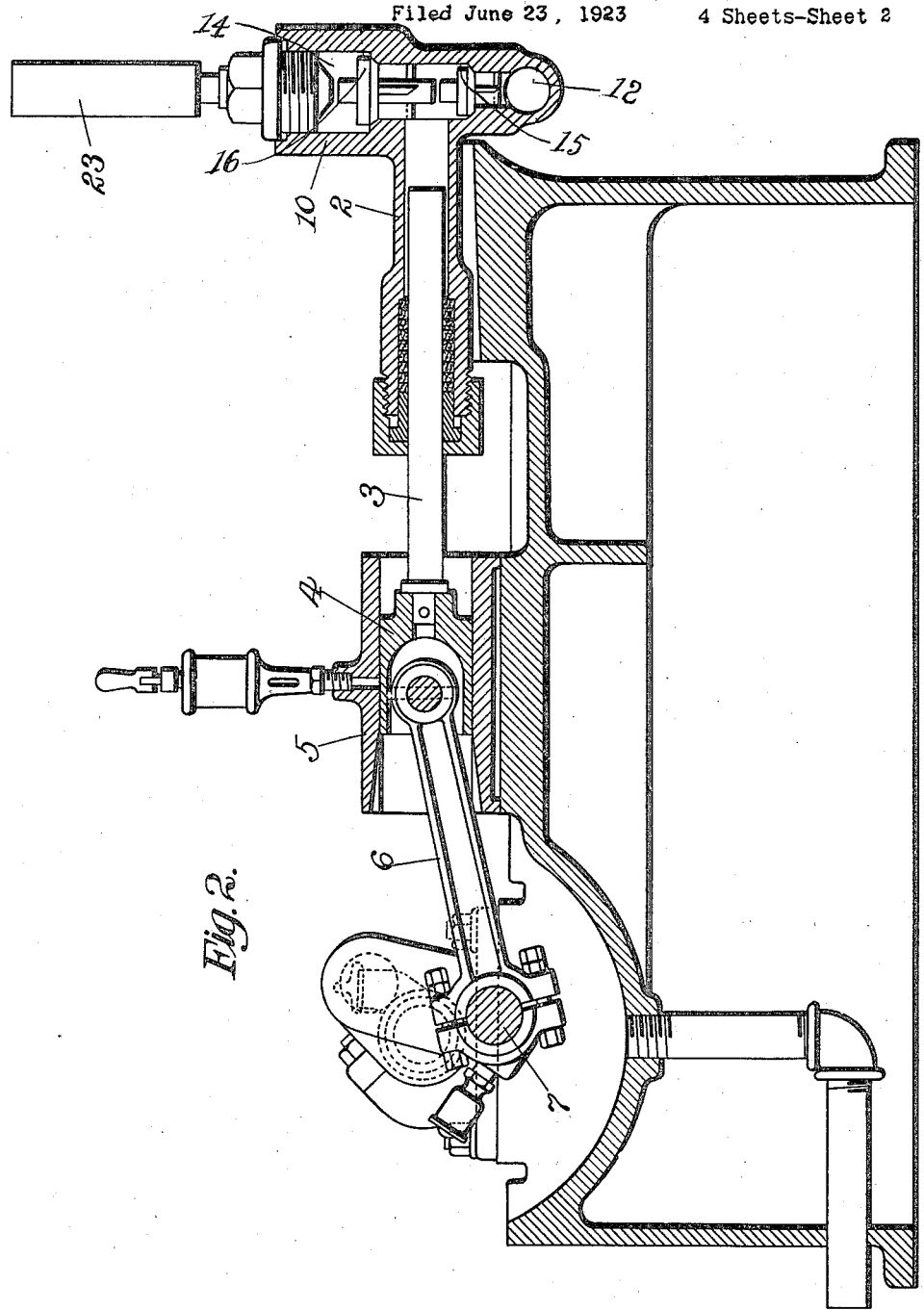
Fig. 2 is a longitudinal cross sectional view of the machine shown in Fig. 1.
Figure 3:
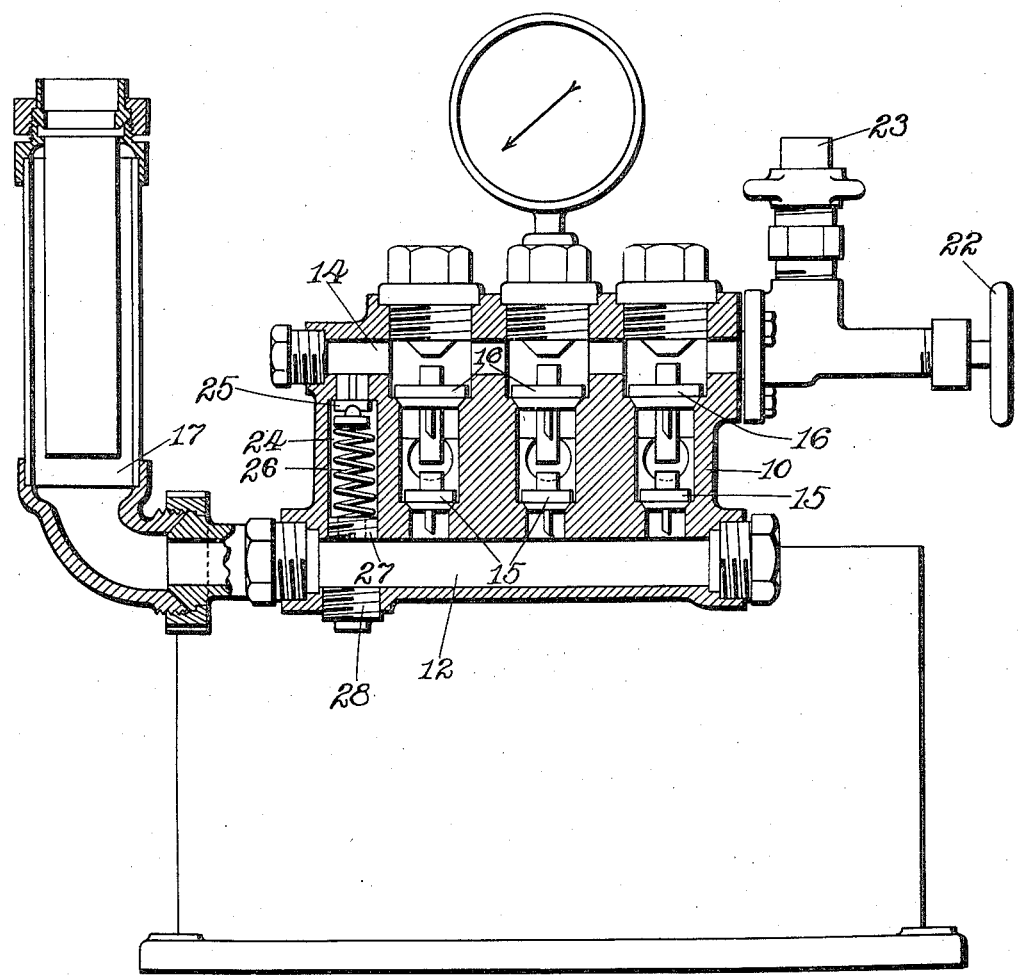
Fig. 3 is a cross sectional view through the valve casing on the line 3—3, Fig. 1.

The construction shown in the drawings comprises three parallel cylinders, indicated at 2, which are located horizontally closely adjacent to each other. Pistons 3 work in the respective cylinders through suitable stuffing boxes and each piston is connected at its rearward end to a cross head 4 which reciprocates horizontally in a cross head guide 5. A connecting rod or pitman 6 connects each cross head 4 with a crank on a crank shaft 7 which is supported in suitable bearings and is driven through tight and loose pulleys 8 and 9, respectively, Fig. 1. At the forward ends of the cylinders is a valve casing 10 which contains three sets of valves, one for each cylinder. These valves are located between an inlet or low pressure chamber 12 and an outlet or high pressure chamber 14, and each set consists of an inlet valve 15 and an outlet valve 16. The liquid to be treated is led into the inlet or low pressure chamber 12 through suitable connections indicated in general at 17, Fig. 3. The liquid under pressure flows out of the pressure chamber 14 between squeezing elements 18 and 19 which are pressed together by a spring 20 acting through a washer or plug 21. The pressure of the spring is adjusted by a hand wheel 22. After passing between the squeezing surfaces the liquid flows out through an outlet 23.

The construction so far described is substantially like that of the present low pressure homogenizers or blenders. For the purpose of limiting the pressure to which the liquid will be subjected, I have provided a by-pass 24, Fig. 3, between the high pressure chamber 14 and the low pressure chamber 12. The flow of liquid in either direction through this by-pass normally is prevented by a check valve 25 which is held in its seat by a coiled spring 26. This spring is backed up by a threaded ring or screw 27 which is located in the end of the by-pass adjacent to the inlet 12, and access to this screw may be had through a hole normally closed by a threaded plug 28.

It will now be understood that if the pressure on the liquid in the chamber 14 rises above a certain point, the valve 25 will be unseated and a part of the liquid will flow back through the by-pass and into the low pressure chamber or inlet 12. The pressure to which the liquid is subjected therefore is limited by the pressure with which the spring 26 holds the check valve 25 in its seat. By turning the screw 27 in or out the pressure of the spring may be adjusted so that a wide variation in the pressure maintained on the liquid is permitted. Due to the location of the plug 27 and the fact that access thereto is difficult, any unauthorized tampering with the adjustment of the check valve is avoided. It will also be observed that the pressure limiting devices are very simple in construction, economical to manufacture, and extremely reliable. The invention thus overcomes the difficulty which has been experienced heretofore in maintaining the proper degree of pressure on the liquid being treated.

While I have herein shown and described the best embodiment of my invention that I have so far devised, I do not wish to be limited to the exact details of the construction shown.

Having thus described my invention, what I desire to claim as new is:

1. In a blender, the combination of a high pressure pump, squeezing elements between which the pumped liquid is forced, and means for automatically by-passing liquid from the high pressure to the low pressure side of the pump when the pressure on the liquid exceeds a substantially predetermined point.

2. In a blender, the combination of a high pressure pump, squeezing elements between which the pumped liquid is forced, said pump having high pressure and low pressure chambers, a by-pass between said chambers, and a check valve in said by-pass normally preventing the flow of liquid therethrough but permitting such flow when the pressure in said high pressure chamber exceeds a substantially predetermined point.

3. In a blender, the combination of a high pressure pump, squeezing elements between which the pumped liquid is forced, said pump having high pressure and low pressure chambers, a by-pass between said chambers, a check valve in said by-pass, a spring bearing on said valve and holding it seated, and means whereby the tension of said spring may be adjusted.

4. In a blender, the combination of a pump comprising a plurality of parallel cylinders arranged side by side closely adjacent to each other, a plurality of pistons working in said cylinders, a valve casing connected to said cylinders and having high pressure and low pressure chambers therein with a plurality of sets of valves between said chambers, each set of valves cooperating with one of said cylinders, a by-pass in said casing connecting said high pressure and low pressure chambers, a check valve in said by-pass normally preventing the flow of liquid therethrough, a spring bearing on said valve and normally holding it seated, and a screw backing up said spring and adjustable to vary the tension of said spring, whereby said check valve will be unseated and will permit liquid to flow through said by-pass when the pressure in said high pressure chamber rises above a substantially predetermined point.

JOHN M. COLONY.